United States Patent [19]

Maine

[11] 4,457,006
[45] Jun. 26, 1984

[54] GLOBAL POSITIONING SYSTEM RECEIVER

[75] Inventor: Reuben E. Maine, Charlottesville, Va.

[73] Assignee: Sperry Corporation, New York, N.Y.

[21] Appl. No.: 321,945

[22] Filed: Nov. 16, 1981

[51] Int. Cl.³ .......................................... H04L 27/06
[52] U.S. Cl. ..................................... 375/87; 375/97; 455/264; 455/316
[58] Field of Search .............. 331/11, 22, 1 R; 375/1, 375/83, 87, 97; 455/257, 261, 264, 265, 316

[56] References Cited

U.S. PATENT DOCUMENTS

| | | | |
|---|---|---|---|
| 3,311,832 | 3/1967 | Schrader | 455/264 |
| 3,623,098 | 11/1971 | Jones et al. | 375/97 |
| 4,198,604 | 4/1980 | Holdaway | 455/316 |

Primary Examiner—Benedict V. Safourek
Attorney, Agent, or Firm—Howard P. Terry

[57] ABSTRACT

In a Global Positioning System type of navigation system, a biphase modulated radio frequency input signal is applied to the "front end" of a double heterodyne receiver having a second intermediate frequency stage which operates in the audio frequency range. The audio output signal is phase locked to a 1 KHz reference signal and is applied to a microprocessor for processing via an interface circuit which includes a relatively simple amplitude detector and a novel biphase detector. The microprocessor also controls the phase shifting of a pseudorandom noise code generator whose output is modulated with the output of the first intermediate frequency stage of the receiver.

8 Claims, 6 Drawing Figures

GLOBAL POSITIONING SYSTEM RECEIVER

BACKGROUND OF THE INVENTION

1. Field of the Invention

The present invention relates generally to spread spectrum systems and more specifically to a marine navigation receiver well adapted for use with the Global Positioning System.

2. Description of the Prior Art

The Global Positioning System, which hereinafter will simply be referred to as GPS, is a developmental satellite navigation system. When fully deployed, GPS will consist of a constellation of 18 satellites which will enable a user to view no fewer than four (with slight exception) useable satellites from any location at any time. One suggested configuration has the satellites placed in six earth centered circular orbits of three satellites, each orbital plane being inclined at an angle of 55 degrees to the plane of the equator, and the six orbital planes being spaced at 60 degrees along the equator. The satellites orbit at approximately 11,000 nautical miles above the earth and are maintained in an almost perfect circular orbit by the ground control segment of the GPS system. Each satellite transmits data which enables the user to calculate a correction for its clock time and to calculate its position to within several meters. The satellite clock and orbit are monitored by ground control stations and the data is uploaded to each satellite every day for a 24 hour period. The data transmitted by the satellite is changed hourly to preserve the desired system accuracy. Coarse ephemeral data for all satellites is transmitted by each satellite in the system on a sequential basis, enabling the user to create an almanac for the entire system from any one signal.

The data is modulated by two pseudorandom noise codes resulting in a spread spectrum transmission from the satellite. This technique provides the ability to select any one satellite by the use of a family of codes which have very low cross correlation coefficients with other members of the family. These codes also possess very low auto-correlation sidelobe responses allowing the unambiguous measurement of time delay and hence range. The correlation or "despreading" process in the receiver provides a large "processing gain" which provides good signal to noise ratios with low transmitted signal levels, and tends to reject interfering signals which are usually found in the marine environment. The two codes, "clear/acquisition" (C/A code) and "precision" (P code), modulate the carrier in a quadriphase manner so that each may be received individually without interference by or even the need to demodulate the other. As the name implies, the C/A code is transmitted in the clear and is used for the initial acquistion of each satellite. The P code, which is presently transmitted in the clear but which may be encrypted at the discretion of the system for national security reasons, provides the highest accuracy of range measurement and hence system accuracy.

One of the larger contributors to system error, if not corrected, would be the variable ionospheric delay of the carrier as a function of night/day, sunspot activity, geographic location, etc. Fortunately, this delay, though variable, is a well behaved function of frequency being proportional to $1/F^2$. Therefore, the signal is transmitted on two carriers, the primary (L1) carrier at 1575.42 MHz and the secondary (L2) at 1227.6 MHz enabling the user to compensate for the ionospheric delay. An approximation of the delay correction is transmitted in the satellite data, allowing the omission of the second frequency while still permitting correction of about 50% of the error.

If the clock in the receiver is exactly aligned with GPS time, then the receiver can measure directly the range to each satellite in view. If the receiver's location contains three unknowns (latitude, longitude and altitude), then three independent range measurements are necessary for the solution of position. If the receiver clock is not in exact alignment with GPS time, then an additional unknown is entered into the equations for solution and an additional independent range measurement must be taken to allow solution with four unknowns.

If the receiver is located on a vehicle of high dynamic performance, then the vehicle control system requires position information at a rate that dictates the simultaneous reception and measurement of the signals from four satellites. In practice, a fifth channel would be added to expedite the changing of satellite selections. In extreme situations, such as might be found in military applications, it is also desirable to couple the vehicle's inertial navigation system into the receiver's tracking system to aid in "coasting" during periods of temporary signal loss due to aircraft attitude, enemy jamming, etc.

The requirements for a receiver to achieve maximum system accuracy and capability include: five simultaneous receiver channels, dual frequency operation (L1 and L2), dual code operation (C/A and P), and inertial aiding input. For many applications, the receiver requirements may be quite different; some have high accuracy, low dynamic requirements, including remaining in a fixed location for some time (military land vehicles); some have relaxed accuracy requirements but modest dynamic behavior (light aircraft); some require accuracy beyond the stated system capabilities which may possibly be obtained by special receiver techniques (survey and time transfer receivers); and some have minimal requirements of accuracy and dynamic capability (marine navigation).

Using the U.S. Coast Guard's requirements for coastal confluence navigation, the accuracy requirement is set at: $\pm\frac{1}{4}$ nautical mile, 95% probability; and the dynamic capability at a system data update each 60 seconds. These specifications can be met with a receiving equipment having: single frequency receiver; C/A code only; one channel, sequenced between four satellites; and latitude, longitude and time outputs. Several existing navigation systems provide, to some degree, the information expected of a GPS system. The cost of these existing systems, however, is relatively high. Accordingly, it can be appreciated that there is a need for a relatively low cost receiver which is compatible with GPS and which can fulfill marine navigation requirements.

SUMMARY OF THE INVENTION

The apparatus of the present invention provides a relatively low cost marine navigation receiver which is well adapted for use with GPS. The "front end" of the novel receiver is basically a double heterodyne type receiver which is responsive to a biphase modulated rf input signal that is supplied by an ominidirectional antenna unit. The rf input signal is mixed in first and second if stages with a pair of phase locked signals provided by frequency multipliers and a voltage controlled oscillator. A correlator, preferably disposed in the "front end" of the receiver, also modulates the rf input signal with a locally generated C/A pseudorandom noise code. The output of the second if stage is a biphase modulated signal in the audio range, e.g., 1 KHz, which is applied to a tuned audio amplifier to provide a receiver output.

The audio receiver output of the "front end" is then fed to computing means or preferably a microprocessor via an interface or audio processing circuit. The first requirement is to detect the presence of the receiver output during the search mode of operation. This is done with a simple amplitude detector and analog-to-digital converter which sends the amplitude data to the microprocessor. The receiver output also feeds a high gain limiting amplifier which converts the signal to digital logic levels. The microprocessor accepts this data at the 1 KHz rate, processing it to obtain the satellite data. The digital signal also enters a special phase detector which develops an error signal to lock a 1 KHz reference signal to the biphase modulated signal. This error signal is amplified, added to a coarse AFC level supplied by the microprocessor and fed to the voltage controlled local oscillator to complete a phase locked loop. The fast AFC output is monitored by the microprocessor, which accordingly adjusts its coarse AFC output to keep a fast AFC circuit near the center of its operating range. The acquisition and tracking of the received signal requires that the locally generated C/A code be maintained in time correlation with the transmitted C/A code. This is accomplished by microprocessor-controlled advance or retard of the code clock phase by 0.1 chip increments in a phase shifter. The vernier measurement of local C/A code time is made by determining the phase offset of this 1.023 MHz code clock from a 1.023 MHz timing oscillator using a phase comparator.

The 1.023 MHz timing oscillator controls the system timing by interrupting the microprocessor at one millisecond (ms) intervals. The same one ms signal halts the code generator on the transition following the microprocessor command to drop the satellite under track and restarts when the data from the old satellite has been read into memory and the next satellite data entered into the code generator. The data is entered into a 16 bit code latch which includes a 6 bit designation of the next satellite to be tracked and a 10 bit prediction of the initial code state required to minimize search time. During the time the code generator is halted, the predicted coarse AFC level for the next satellite is loaded into a frequency latch and a gain latch is set for maximum gain.

DESCRIPTION OF THE PREFERRED EMBODIMENT

Spread spectrum techniques in recent years have gained wide use in the fields of communications and navigation systems. Spread spectrum systems are a blend of analog (usually rf) and digital disciplines and are well known in the art. An excellent discussion of these systems appears in a book by R. C. Dixon, entitled *Spread Spectrum Systems,* John Wiley & Sons, 1976.

Figure 1:
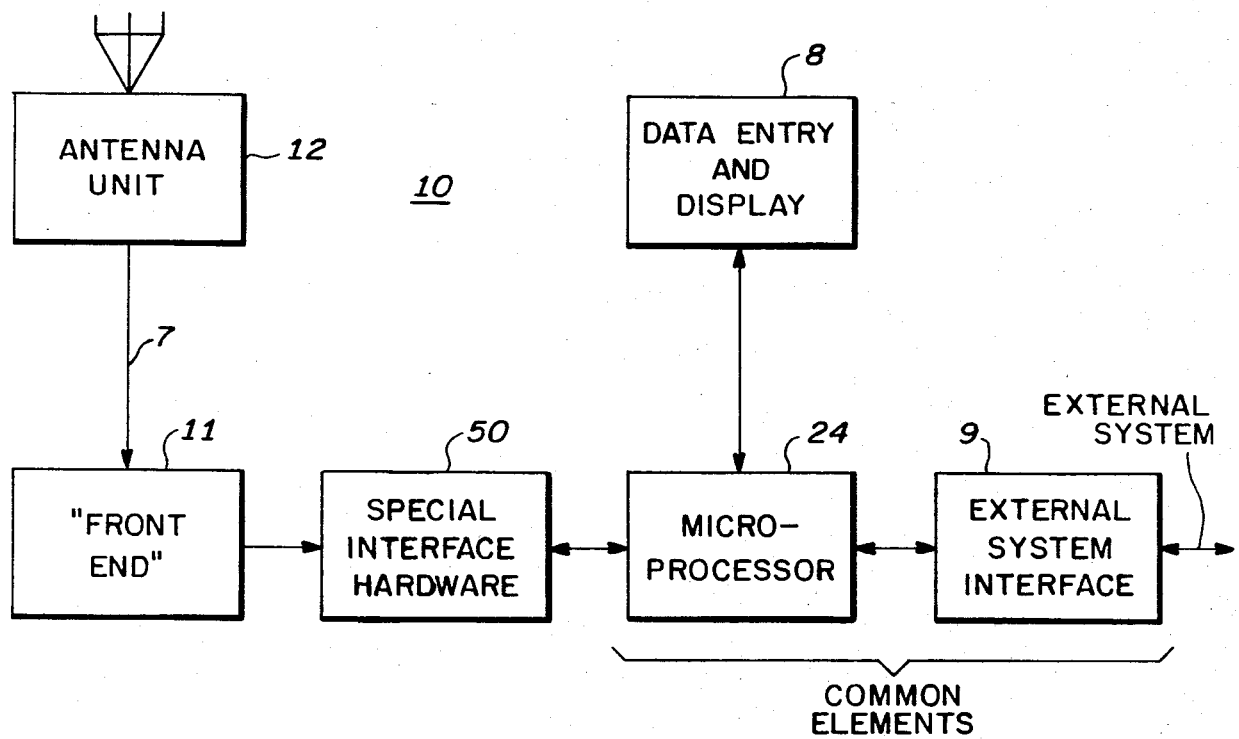
FIG. 1 is a block diagram of a typical navigation receiver.

Referring now to FIG. 1, a block diagram illustrates a typical prior art navigation receiver 10 which may be adapted for use within a Loran, Transit, Omega or GPS system. Typically an rf modulated signal is coupled to the "front end" 11 of the receiver via an antenna cable 7 which leads from an omnidirectional antenna unit 12. Special interface hardware 50 processes the received signal for application to a microprocessor 24. Access to the microprocessor 24 is provided by a conventional data entry and display device 8. An external system interface 9 couples the navigation receiver 10 to an external Loran, Transit, Omega, or GPS system.

Figure 2:
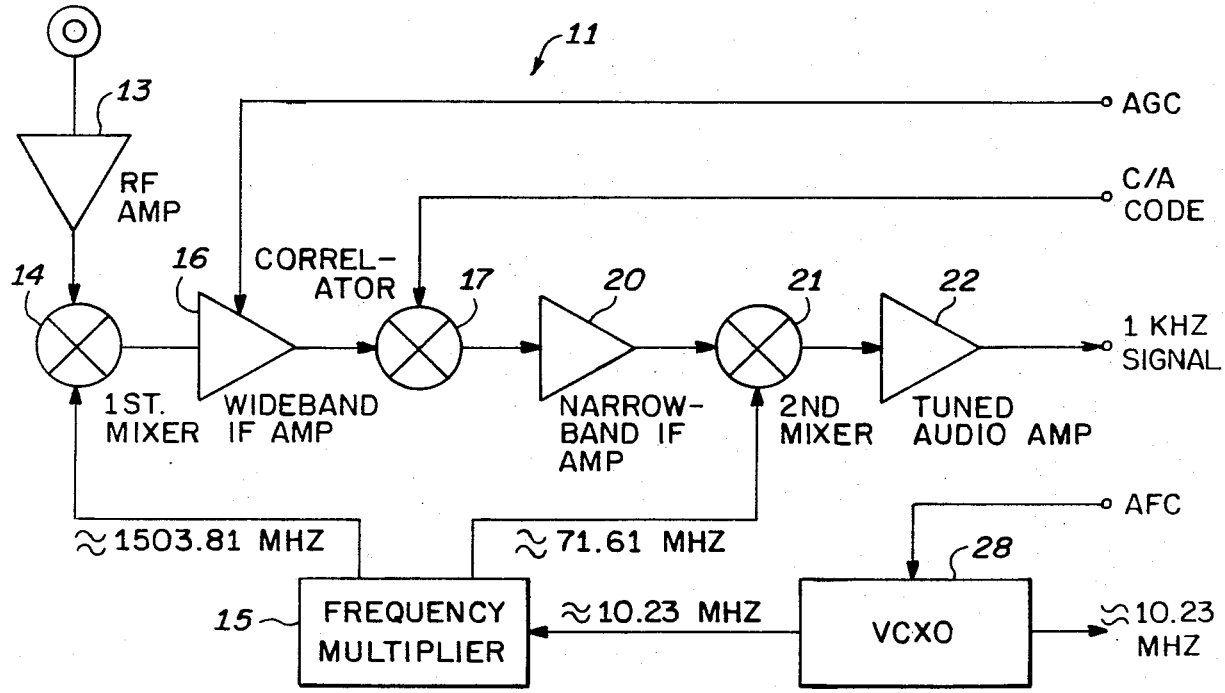
FIGS. 2, 3 and 4 are functional block diagrams of the apparatus of the present invention.

Referring now to FIG. 2, a block diagram illustrates a novel single channel receiver 10 which is well adapted for use in a spread spectrum system such as the Global Positioning System. The "front end" 11 of the GPS receiver 10 is generally designated by the arrow 11 and is basically a double heterodyne receiver with the second intermediate frequency in the audio range. A biphase modulated rf signal having approximately a 1575.42 MHz frequency is supplied to the GPS receiver 10 via an omnidirectional antenna unit 12. The rf input signal is amplified by rf amplifier 13 which is coupled to a first mixer 14. The first mixer 14 heterodynes the rf input signal with a signal having approximately a 1503.81 MHz frequency which is provided by a frequency multiplier 15. The output of the first mixer 14 is applied to a wideband if amplifier 16, which is responsive to an automatic gain control (AGC) signal. The modulation in a despread modulator or correlator 17 of the first intermediate frequency with a locally generated C/A pseudorandom noise code as a technique of correlation is preferred since it permits future addition of a P code correlator at the same point. It should be noted, therefore, that the location of the correlator 17 is a matter of design choice. The bandwidth of the receiver 10 up to this point is approximately 30 MHz which is adequate to pass the P code. The output of the despread modulator or correlator 17 is applied to a second mixer 21 via a narrow band if amplifier 20. The second mixer 21 heterodynes the despread signal with a signal having approximately 71.61 MHz frequency and applies the audio frequency output signal to a tuned audio amplifier 22. The output of the tuned audio amplifier 22 is a 1 MHz carrier signal from which the C/A code modulation has been removed by the correlating modulation, and the P code sidebands, other noise, and interfering signals have been attenuated by the narrow banding following the modulation.

The local oscillator frequencies, i.e., the 1503.81 MHz and the 71.6 MHz signals, required to generate the 1 KHz output signal, are derived from a voltage controlled crystal oscillator (VCX0) 28, using the phase-locked frequency multipliers 15. The VCX0 28 is required to have relatively low phase noise, good short term stability, and a repeatable voltage/frequency function. The long term stability required is a function of the expected offtime (or no signals) and the search time permitted for the acquisition of the first satellite. Once any satellite is acquired, the oscillator may be calibrated by the software, and subsequent frequency estimates will be accurate. A modest quality oven oscillator will provide initial acquisition without frequency searching for an off period of several days to a week. The preferred mode of operation is to leave the equipment on continuously. Preferably, the equipment is provided with a time display so that the equipment may be compared to a chronometer that all mariners know as a continuously operating instrument as opposed to most other equipment which is shut down when at dockside.

Figure 5:
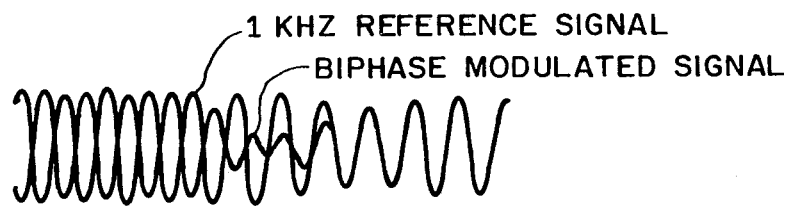
FIG. 5 is an illustration of waveforms associated with the apparatus of the present invention.

The choice of a 1 KHz carrier signal, rather than a baseband output signal, permits a considerable simplfication in the receiver 10 hardware. The bandwidth of the 1 KHz amplifier 22 permits acquisition of signals about plus or minus 500-Hz about the nominal frequency using a simple amplitude detector, hereinafter described, while providing an excellent signal-to-noise ratio. FIG. 5 graphically illustrates the 1 KHz receiver signal along with a locally generated 1 KHz reference signal that is phase-locked to the received signal. The illustration also shows the biphase modulation of the signal by the satellite data stream.

Figure 3:
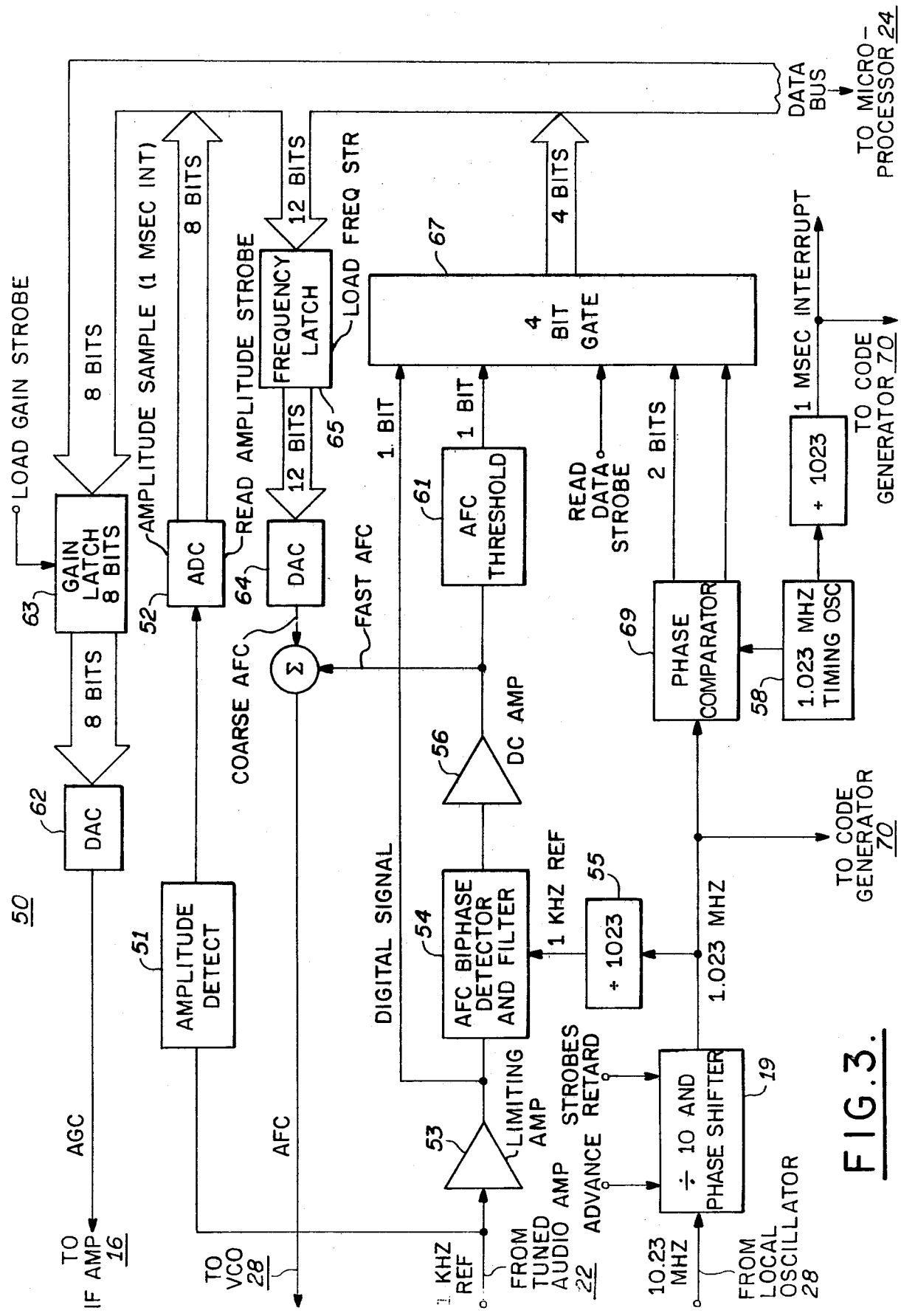

FIG. 3 illustrates a block diagram of the interface or audio processing circuits 50 necessary to interface the "front end" 11 with the computer or microprocessor 24. The first requirement of the hardware interface 50 is to detect the presence of a receiver output signal, i.e., the biphase modulated output signal of the tuned audio amplifier 22 which typically has a frequency of roughly 700 to 1500 Hz. In the apparatus of the present invention this is done with a simple amplitude detector 51 and an analog-to-digital converter 52 which sends the amplitude data to the microprocessor 24. Preferably, the amplitude detector 51 includes a conventional diode detector and filter. Once the signal amplitude is in the microprocessor 24, it may be filtered to obtain a background noise level; compared periodically to that noise level for a signal detection; used to control the receiver gain with a digital-to-analog converter 62 and gain latch 63; used as a signal quality indicator; or compared to itself on a time shared basis for tau dither correction detection, as hereinafter described.

The 1 KHz output from the audio amplifier 22 of receiver 10 is hard limited to TTL logic levels by a high gain limiting amplifier 53 and sent to the microprocessor 24 via a gate 67. It should be noted that this digital signal still contains the biphase modulation of the satellite data and the microprocessor 24 may now process the signal to obtain the transmitted data and to synchronize local time within 1 millisecond using the "Z count" and bit sync information. This represents a considerable saving in hardware compared to the conventional I and Q channels, integrate and dump techniques commonly used with a baseband output system. The digital signal is also applied to a special biphase detector and filter 54 that generates a phase error signal used to close a generally conventional phase-locked loop back to the VCX0 28.

Preferably, the phase detector 54 is of a type which is described in copending U.S. patent application Ser. No. 239,084, entitled "Biphase Detector", filed Feb. 27, 1981 and assigned to the Applicant's assignee. The phase detector 54 includes a D-type flip-flop and two exclusive OR gates to produce a phase control voltage which locks the 1 KHz reference signal from frequency divider 55 to the receiver output signal of the tuned audio amplifier 22. In the phase detector 54 the phases of the biphase modulated receiver output signal and the 1 KHz reference signal are compared to provide the error or phase control signal that controls the voltage control oscillator 28 so as to maintain the phase quadrature between the reference signal and the biphase modulated receiver output signal. The phase detector 54 also provides a digital output signal representative of the data contained in the biphase modulated receiver output signal. This relatively simple circuit, therefore, has the same effect as a costa loop in a conventional spread spectrum system.

Since the doppler range of the satellite is quite large, an initial estimate of frequency is added by a digital-to-analog converter 64 and latch 65 from the microprocessor 24. This initial estimate is representative of a coarse AFC signal. Once locked on frequency, the microprocessor 24 monitors the output d.c. amplifier 56 and alters the coarse AFC output signal to maintain the fast AFC signal and its associated circuitry near the center of its operating range. A comparison of the coarse AFC output signal to the calculated doppler offset permits calibration of the voltage/frequency function of the VCX0 28.

When the signal processing circuits indicate proper lock on the received signal, the microprocessor 24 integrates the samples from the AFC threshold detector 61. Correction of the coarse AFC is applied to keep the above and below samples equal and hence keep the fast AFC circuit in the center of its operating range. The AFC is also assisted by the correlation tracking circuits so that the acquisition of a signal too far off frequency for the AFC circuit to lock will drive the coarse AFC output in a direction to correct the frequency error.

A phase shifting function is used to achieve and maintain time correlation between the locally generated pseudorandom noise (PRN) code and the received code. The phase is shifted incrementally by a phase shifter 19 and a microprocessor 24 at a high rate until correlation is detected. During the tracking of the satellite, the phase is periodically advanced and retarded by a small amount to generate an amplitude error signal for detection of the correlation peak (tau dither). Single increment long term adjustments are made by the microprocessor 24 as necessary to keep the correlation at the peak. In effect the phase of the correlation code is dithered or alternately shifted to each side of the correlation peak at a very low frequency. The microprocessor 24 supplies a reference square wave which allows differential detection of the amplitude. The output of the amplitude detector 51, therefore, is used by the microprocessor 24 to keep the code on the correlation peak. Moreover, the phase corrections so separated are integrated and added to the coarse frequency control signal, as described above, to bring the frequency within range of the phase locing circuitry, associated with the VCX0 28.

It should be noted that the 1 KHz reference used in the biphase detector 54 is taken from the phase-shifted code clock. Because in normal operation this is phase-locked to the received signal, no long term adjustment of the phase should be necessary so long as lock is maintained. This is almost true, but not quite so, as the use of a 1 KHz output rather than baseband (while still using simple ratios in the local oscillator multipliers) causes a small but accurately known offset in frequency and hence the periodic incrementing of phase by the microprocessor 24. Moreover, the vernier measurement of local C/A code time, is made by determining the phase offset of the 1.023 MHz code clock from a 1.023 MHz timing oscillator 58 using a phase comparator 59. This is done under programming control and does not enter into the correlation error detection.

Figure 4:
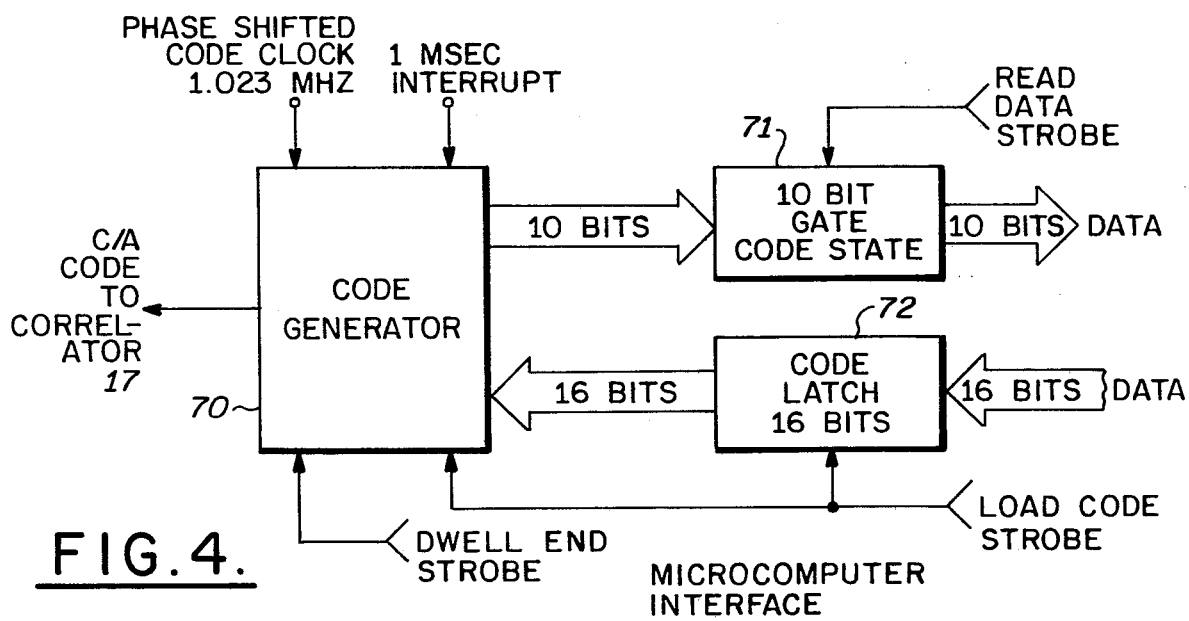

Referring now to FIG. 4, a block diagram illustrates the heart of the range measuring hardware which includes code generator 70, gate 71, and latch 72. The technique used is to stop the code clock as precisely as possible at the occurrence of a timing mark. The accuracy of the local timing clock for this application is not too important as long as it is stable. The microprocessor 24 determines the duration of tracking of the satellite and sets the hardware by means of a "DWELL END" strobe to stop at the next timing mark. The PRN code state at the time of stopping as well as the phase shift of the clock may now be taken into the microprocessor 24 at leisure. This technique simplifies both hardware and software in the equipment. All satellite range measurements are automatically referenced to a common time base for easy interpolation in a sequential system as opposed to random times resulting from code epoch time measuring techniques.

The epoch measuring technique also typically requires the additional high speed hardware latch 72 to store the time measurement until the microprocessor 24 can fetch it. The PRN code generator 70 is also turned on in synchronization with the same time mark 2 milliseconds later, having been preset to a new PRN code and code state by the microprocessor 24 to minimize search time while sequentially tracking. The choice of interrupt time to agree with the C/A code duration considerably simplifies the preset calculations as the microprocessor 24 keeps local time by counting interrupts. As mentioned above, this entire process is controlled by the software of microprocessor 24 and a greater appreciation of the operation of the present invention may be achieved through a description of the softeware.

Figure 6:
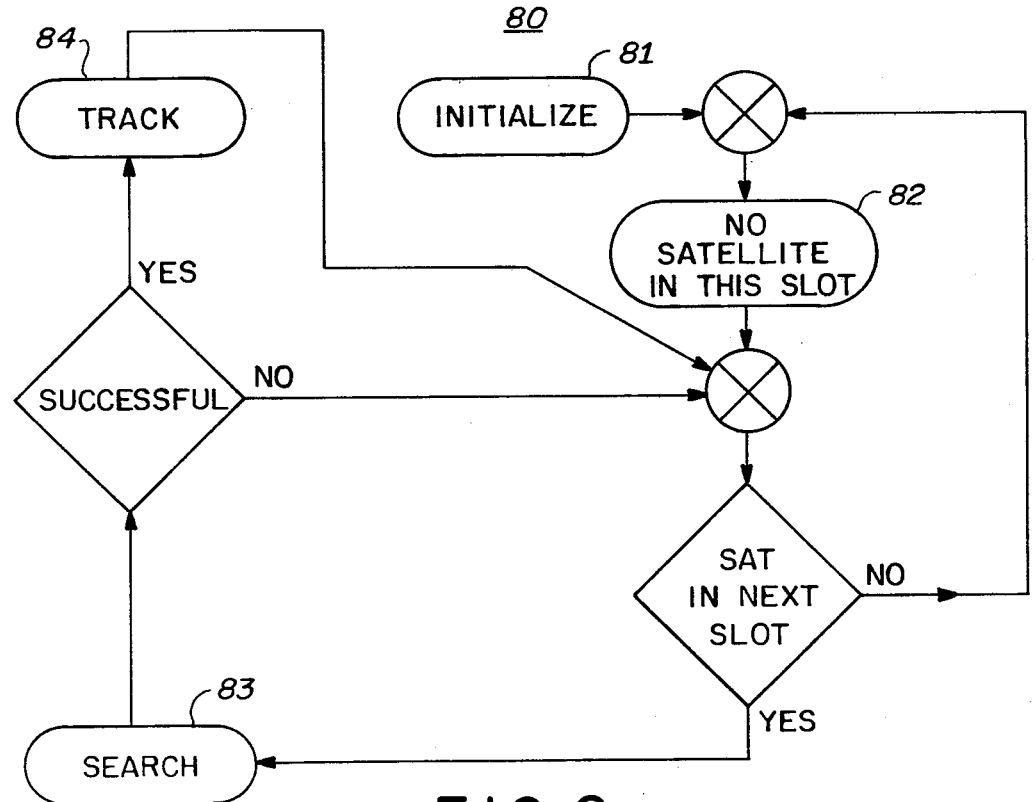
FIG. 6 is a simplified flow chart of the software used to control the apparatus of the present invention.

Referring now to FIG. 6, a simplified flow chart of a real time program 80 for controlling the hardware of the present invention is illustrated. The programming is somewhat unusual in that each primary function times itself and in its last 1-millisecond period sets the interrupt vector to the next appropriate function depending on the decision results. A background program then has no direct tie to the real time program 80 once initialization has occurred. Alterations to the real time program 80 such as assigning satellites are accomplished by entering data into specific memory locations and/or setting flags. Of course, at the completion of each 1-millisecond task, the real time program 80 returns to the background program until the next interrupt occurs. This approach has proved very effective in that the background program may be almost anything, for example, the utility monitor supplied with the microcomputer which runs quite satisfactorily along with the real time program. The terminal connected to the microprocessor 24 may then be used as a data entry and display service and the background program can be diverted to typical programs required of system operation, such as data processing, position fix, and almanac prediction programs while continuing to track satellites.

The "INITIALIZE" routine 81 clears Random Access Memory (RAM), sets up initial conditions, synchronizes itself to the interrupts, then enables the interrupt handler for the real time program 80. Continuation of initialization routine is then the beginning of the background program.

The major events in the real time program 80 are keyed to a rather large time increment, typically several seconds for this application. The "NO SATELLITE IN THIS SLOT" routine 82 simply waits until the end of one time unit then checks to see if a satellite is assigned to the next tracking slot. Each of four tracking slots is viewed sequentially by the program and any satellite may be assigned to any slot. Whenever it is detected that a satellite has been assigned to a tracking slot, the program advances to the "SEARCH" routine 83. This initializes the frequency and code state to minimize search time for the new satellite. If, after a maximum time, the search has not been successful, the program aborts to the next slot. For this application the search rate has been set so that a complete search of the C/A code occurs about once every 20 seconds. The maximum search time allows several complete passes before it absorts.

The phase of the C/A code is advanced at a rate of about one code cycle (1023 chips) during a 20 second period. Since the autocorrelation function is a triangle of two chips width, the receiver amplitude output rises from zero to 50% in 10 ms and stays about 50% for 20 ms. When the amplitude threshold is exceeded, the searching is halted and the amplitude is retested a number of times with sufficient delay between tests to insure independent samples.

Once the signal has been detected, the "SEARCH" routine 83 drops the incremental phase shifting to the tracking rate and verifies that the signal is still present for M-out-of-N samples, separated in time by 100 milliseconds or so. This permits a good detection probability while maintaining almost zero false acquisition rate. The operation is enhanced by the fast AFC hardware that tends to make the subsequent samples have a higher signal level than the first for a bona fide signal.

After verifying the signal, the program advances to the "TRACK" routine 84 which does just that. On demand, this routine will gather data from the satellite for approximately 2 minutes to ensure the reception of three complete data frames and stores the data in RAM. The background program processes this data to verify the accuracy of reception and stores it in data banks for use in its calculations. During tracking the routine is continually checking for bit sync in the data. Each time two successive bit sync determinations occur, some exact multiple of 20 milliseconds apart, a "good bit sync" is declared, a bit sync counter is incremented, and AFC control voltage and time are recorded. The bit sync counter may be used as a signal quality indicator. The recording of AFC voltage at the occurrence of good bit sync assures that the signal was phase-locked when the record was made, providing a guarantee of accuracy in the prediction of frequency for the search function.

At the end of the track period, typically about 15 seconds a satellite, the "DWELL END" function occurs and the code state is recorded for calculation of range. The program 80 allows a large time history of range and frequency to be stored although the present position calculation routine uses a maximum of the last two adjacent range measurements of each satellite. At the completion of the data recording function, the program advances to the next tracking slot and continues.

It can be appreciated that the apparatus of the present invention has several advantages over the prior art. A first advantage is that the present invention uses one detector instead of two (I and Q channels) used in conventional designs, which also eliminates the requirement for a quadrature second local oscillator source. A second advantage is that the use of an audio output enables the final bandpass limiting to be done with a simple audio amplifier. A third advantage is that the use of an audio output as opposed to "baseband" or DC output allows the oscillator noise around zero frequency to be attenuated by the audio passband. Since noise is most severe at that point, this represents an improvement in operations or alternatively a relaxed oscillator requirement. A fourth advantage is that the use of an audio frequency allows a wide frequency error for initial acquisition, again relaxing the reference oscillator requirement. A fifth advantage is that the use of an audio frequency allows simple integration with an amplitude detector having a time constant which is long in comparison to the integrate and dump (boxcar) detectors used in conventional receivers. A sixth advantage is that the use of an audio frequency, specifically one KHz, makes retrieval of the data from the receiver output relatively easy. The one KHz rate allows direct processing by a simple microprocessor. Lastly, the use of a 1 KHz output as described above is most conveniently accomplished by having the reference oscillator run at a small offset from its nominal frequency. This introduces a small but accurately known frequency offset which is small compared to the normal doppler offset of the signals and which can be easily nulled in the computer program.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A receiver for use in a navigation system comprising:
    a voltage controlled oscillator,
    means for generating a plurality of signals having phase locked frequencies responsive to said voltage controlled oscillator;
    first mixing means responsive to a biphase modulated radio frequency input signal and a first signal from said phase locked signal generator means for providing intermediate frequency signals;
    second mixing means responsive to the the intermediate frequency signals and a second signal from the phase locked signal generator means for providing audio frequency signals;
    audio signal processing means, responsive to the audio frequency signal and to an audio frequency reference signal that is phase locked to the voltage controlled oscillator for detecting the audio frequency signal amplitude and for providing a fast frequency control signal for the voltage controlled oscillator, and including means for phase shifting the audio frequency reference signal; and
    processing means for providing control signals to the phase shifting means and responsive to the audio frequency signal amplitude, the fast frequency control signal, and the phase shifted reference signal for providing a coarse frequency control signal which is summed with the fast frequency control signal and applied to the voltage controlled oscillator and for obtaining data from the audio frequency signal.

2. A receiver according to claim 1 which further includes correlator means, coupled between said first and second mixing means, for modulating the output of said first mixing means with the output of local coding means which is responsive to said processing means and said phase shifting means.

3. A receiver according to claim 2 further including a wideband amplifier coupled between the first and second mixing means and a gain control means responsive to the audio frequency signal amplitude for controlling the gain of the wideband amplifier.

4. A receiver according to claim 3 wherein said amplitude detecting means includes a diode detector and filter coupled to an analog-to-digital converter.

5. A receiver according to claim 4 wherein said audio processing circuit means further includes biphase detector means responsive to said audio output signal and said reference signal, wherein the error signal of said biphase detector is amplified by a d.c. amplifier to provide said fast frequency control signal.

6. A receiver according to claim 5 wherein said audio processing circuit means further includes a threshold detector responsive to the output of said d.c. amplifier.

7. A receiver according to claim 6 wherein said second mixing means further includes a narrow band amplifier and a tuned audio amplifier.

8. A receiver according to claim 7 wherein said means for generating a plurality of signals having phase locked frequencies includes a plurality of frequency multipliers responsive to said voltage controlled oscillator.

* * * * *